Aug. 22, 1939.                G. MAFERA                2,170,690
                                ALIGNER
                           Filed Nov. 8, 1938
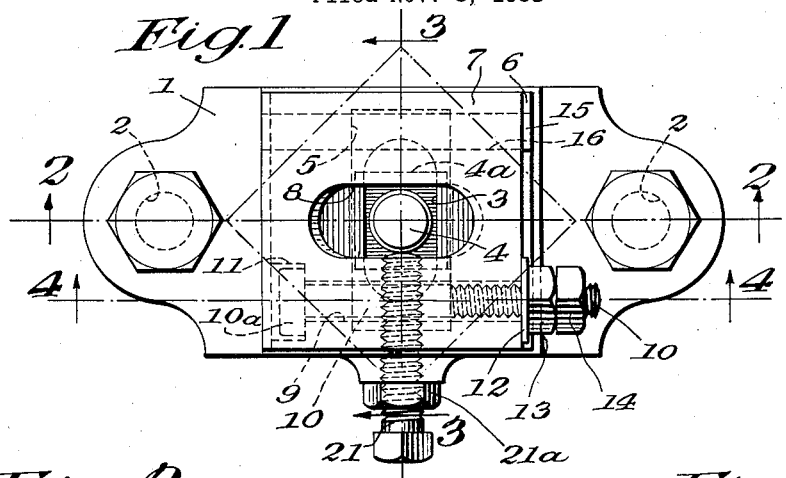
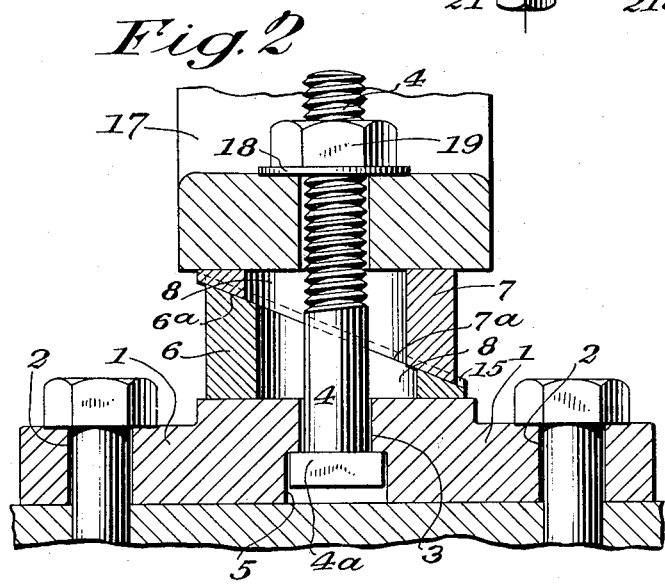
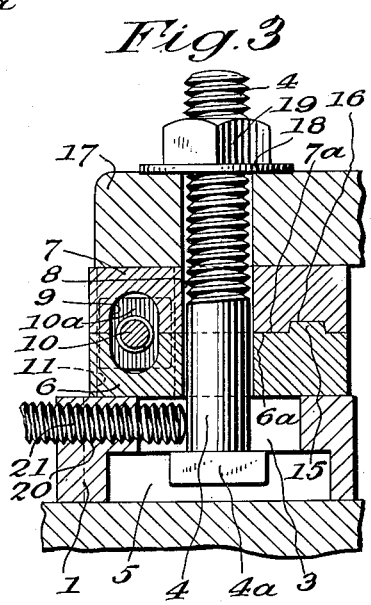
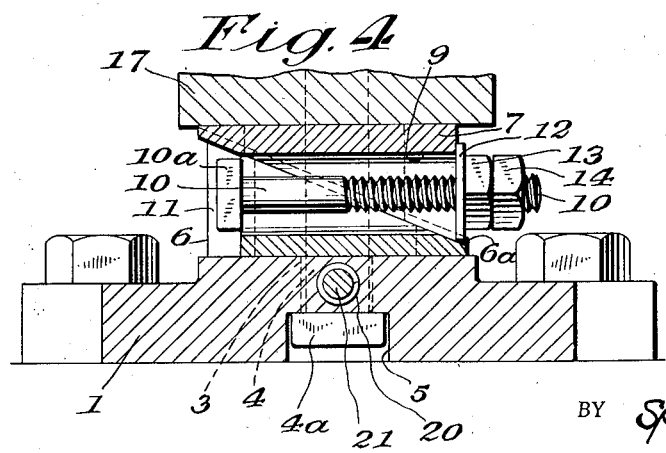
INVENTOR.
Guy Mafera
BY Spear, Rawlings & Spear.
ATTORNEYS.

Patented Aug. 22, 1939

2,170,690

UNITED STATES PATENT OFFICE 2,170,690

ALIGNER

Guy Mafera, Revere, Mass.

Application November 8, 1938, Serial No. 239,453

4 Claims. (Cl. 254—104)

My present invention relates to an improved aligner for use in adjusting an engine or the like relative to its supporting bed to effect its accurate alignment with its shaft.

While my invention may be used to adjustably support many heavy objects, the alignment of marine engines illustrates most clearly the several advantages of my present invention.

In aligning heavy objects, it is generally necessary to attach the machine element and the aligner itself to the supporting bed. While an aligner must, of course, be vertically adjustable, in aligning marine engines, for example, it is also frequently desirable to move the aligner relative to the bed or to that part of the bed to which the aligner may be most effectively secured.

For that reason, it is necessary to mount the members effecting vertical adjustments for bodily movement on a base to be attached directly to the bed and to provide a bolt slidably carried by the base for movement with the adjustable members for attachment to a bracket or like element of a machine or engine.

In my copending application, Serial No. 182,686, filed December 31, 1937, I have shown such an aligner. In the aligner shown in that application, the adjustable members consist of a pair of members having wedge surfaces disposed in mutual contact and being slotted to receive the bolt which is slidably carried by the base. Movement of the members and the bolt relative to the base is effected by rotation of a bolt threaded through the base and through a projection on one of the members, which projection is positioned within a slot in the base parallel with the slot in the base through which the bolt extends.

While such an aligner is of utility, its utility is limited by the fact that since the members are connected at two points to the base, they can not be turned relative to the base. Furthermore, its use is limited by the fact that the bolt is mounted off center in the base so that in certain installations, difficulty is experienced in mounting the aligners on the bed so that the bolt registers with a bracket or the like of the engine.

In my present invention, I eliminate those difficulties and at the same time provide a simpler aligner. In accordance with my present invention, the bolt by which the engine element is secured to the base of the aligner also holds the pair of members by which vertical adjustments are effected. As these members are not elsewhere connected to the base, they may be turned relative to the base when desired.

Bodily movement of the pair of members and the bolt is effected by means of a second bolt threaded through the base at one end of the slot which secures the head end of the first mentioned bolt so that as the second bolt is advanced the main bolt is carrying with it the pair of members.

In the accompanying drawing, I have illustrated a preferred embodiment of my invention. In the drawing:

Fig. 1 is a plan view of an embodiment of my invention.

Fig. 2 is a section through my device along the lines 2—2 of Fig. 1 and showing my device in support of an engine bracket.

Fig. 3 is a view in cross section of my device along the lines 3—3 of Fig. 1, and Fig. 4 is a view similar to that shown in Fig. 2, being taken along the lines 4—4 of Fig. 1.

In accordance with my invention, I utilize a base 1 having spaced holes 2 to receive bolts effecting its attachment to the supporting bed.

The base 1 is provided with a transverse slot 3 for the bolt 4. The slot 3 is countersunk as at 5 to hold the head 4a of the bolt 4 against rotation.

At 6 and 7, I have shown a pair of members having wedge surfaces 6a and 7a disposed in mutual contact. The members 6 and 7 are generally similar to the aligner shown in Letters Patent 2,123,484. The members 6 and 7 are formed with aligned slots 8 to receive the bolt 4.

Each of the members 6 and 7 is formed with a groove 9 on one side of its slot 8 adapted to establish when the members 6 and 7 are disposed with their surfaces 6a and 7a in mutual contact, an aperture to receive a bolt 10. Preferably the thick end of the member 6 is formed as at 11 to establish a countersink to hold the head 10a of the bolt 10 against rotation.

At 12 I have indicated a square washer disposed between the thick end of the member 7 and the nut 13 on the bolt 10. A lock nut is indicated at 14. The use of a square washer is convenient as it rides along the inclined surface 6a as the nut 13 is rotated, holding the bolt 10 in such position that the nut 13 is supported above the groove 9 as the members 6 and 7 are positioned to establish the desired height of my device as the nut 13 is rotated to effect accurate alignment. The member 6, on the other side of its slot 8 is formed with a tongue 15 to enter a groove 16 in the member 7 to ensure the desired position of the members 6 and 7.

The bolt 4 is, of course, of sufficient length to extend through the slots 8 of the members 6 and 7 sufficiently to pass through the engine element indicated by the bracket 17 and to receive the washer 18 and the nut 19.

In order to move the bolt 4 and the members 6 and 7 relative to the base 1, I have formed the base 1 with a threaded aperture 20 effecting communication with one end of the slot 3. The aperture 20 receives the bolt 21 so that as the bolt 21 is rotated, it contacts the bolt 4 just above its head 4a. At 21a I have shown a check nut on the bolt 21.

By this construction, a simple aligner is provided which is well adapted for easy installation and adjustment regardless of the peculiarities of either the object to be aligned or its supporting bed.

By adjusting the bolt 21, the members 6 and 7 and the bolt 4 may be moved relative to the base 1 as desired. By adjustments of the nut 13, the members 6 and 7 are moved to vary the height of my aligner and as shown in Fig. 1, the members 6 and 7 may be turned on the base 1 if necessary so that my novel aligner is well adapted to solve the problems of properly aligning heavy objects.

What I therefore claim and desire to secure by Letters Patent is:

1. An aligner for adjusting a machine element relative to its supporting bed, said aligner including a base for attachment to said bed, said base having a countersunk slot, a pair of members having wedge surfaces disposed in mutual contact and having aligned slots, a bolt extending through said slots in said base and said members to permit said machine element to be attached to said base and to hold said members intermediate said base and said element, the head of said bolt being slidably retained within said base by its countersunk slot when said aligner is assembled, adjustable means coacting with each of said wedge members to effect desired vertical adjustments of said aligner, and adjustable means in contact with said bolt adjacent its head for bodily moving said bolt and said members relative to said base.

2. An aligner for adjusting a machine element relative to its supporting bed, said aligner including a base for attachment to said bed, said base having a countersunk slot, a pair of members having wedge surfaces disposed in mutual contact and having aligned slots, a bolt extending through said slots in said base and said members to permit said machine element to be attached to said base and to hold said members intermediate said base and said element, the head of said bolt being slidably retained within said base by its countersunk slot when said aligner is assembled, adjustable means coacting with each of said wedge members to effect desired vertical adjustments of said aligner, and adjustable means to cause bodily movement of said bolt and said members relative to said base, said last named adjustable means including a second bolt, said base having a threaded aperture in communication with one end of said slot in said base to receive said second bolt.

3. An aligner for adjusting a machine element relative to its supporting bed, said aligner including a base for attachment to said bed, said base having a countersunk slot, a pair of members having wedge surfaces disposed in mutual contact and having aligned slots, a bolt extending through said slots in said base and said members to permit said machine element to be attached to said base and to hold said members intermediate said base and said element while permitting them to be positioned as desired relative to said base within the limits of the slots in said members, the head of said bolt being slidably retained within said base by its countersunk slot when said aligner is assembled, adjustable means coacting with each of said members to effect desired vertical adjustments of said aligner, and adjustable means to cause bodily movement of said bolt and said members relative to said base, said last named adjustable means including a second bolt, said base having a threaded aperture in communication with one end of said slot in said base to receive said second bolt.

4. An aligner for adjusting a machine element relative to its supporting bed, said aligner including a base for attachment to said bed, said base having a countersunk slot, a pair of members having wedge surfaces disposed in mutual contact and having aligned slots, a bolt extending through said slots in said base and said members to permit said machine element to be attached to said base and to hold said members intermediate said base and said element, the head of said bolt being slidably retained within said base by its countersunk slot when said aligner is assembled, adjustable means coacting with each of said wedge members to effect desired vertical adjustments of said aligner, and adjustable means to cause bodily movement of said bolt and said members relative to said base, said last named adjustable means including a second bolt, said base having a threaded aperture in communication with one end of said slot in said base to receive said second bolt and a check nut on said second bolt to lock said second bolt in desired positions.

GUY MAFERA.